United States Patent
Nellums

[19]

[11] Patent Number: 5,901,823
[45] Date of Patent: *May 11, 1999

[54] SYNCHRONIZER INCLUDING RADIALLY-MOVEABLE, RESILIENTLY-BIASED SELF-ENERGIZING MEMBER

[75] Inventor: Richard A. Nellums, Farmington Hills, Mich.

[73] Assignee: Eaton Corporation, Cleveland, Ohio

[*] Notice: This patent is subject to a terminal disclaimer.

[21] Appl. No.: 08/908,087

[22] Filed: Aug. 11, 1997

[51] Int. Cl.⁶ .................................................. F16D 23/06
[52] U.S. Cl. ................................ 192/53.31; 192/53.331; 74/339
[58] Field of Search ................................ 192/53.3, 53.31, 192/53.33, 53.331, 53.332, 53.36, 48.91; 74/339

[56] References Cited

U.S. PATENT DOCUMENTS

| | | | |
|---|---|---|---|
| 1,923,386 | 8/1933 | Murray | 192/53.31 |
| 2,993,579 | 7/1961 | Altmann | 192/53.31 X |
| 3,362,244 | 1/1968 | Ivanchich | 192/53.31 X |
| 4,576,264 | 3/1986 | Lupo et al. | 192/48.91 |
| 5,078,245 | 1/1992 | Nellums et al. | 192/53.332 |
| 5,085,303 | 2/1992 | Frost | 74/339 X |
| 5,092,439 | 3/1992 | Reynolds | 192/53.331 |
| 5,558,194 | 9/1996 | Cox | 192/53.31 |

FOREIGN PATENT DOCUMENTS

| | | | |
|---|---|---|---|
| 1098824 | 2/1961 | Germany | 74/339 |
| 45-27483 | 9/1970 | Japan. | |
| 2 142 390 | 1/1985 | United Kingdom | 192/53 E |

*Primary Examiner*—Charles A Marmor
*Assistant Examiner*—Scott Lund
*Attorney, Agent, or Firm*—Paul S. Rulon; Howard D. Gordon

[57] ABSTRACT

A pin-type, double-acting synchronizer (10) with friction rings (22, 36 and 24, 38), jaw members (30, 26, 28), three circumferentially spaced pins (40) including blocker shoulders for preventing asynchronous engagement of the jaw members, pre-energizer assemblies (42) to ensure initial engagement of the friction rings and blocker shoulders in response to initial engaging movement of a shift flange (32), and self-energizing cams (32f, 32g, 20e, 20f) producing an additive axial force ($F_a$) in response to either of the cams (32f, 32g) moving a rigid link (48) radially inward against either of the cams (20e, 20f). In a modified embodiment the links (48) are replaced by spring capsules (60) which limit the maximum additive force ($F_a$).

17 Claims, 3 Drawing Sheets

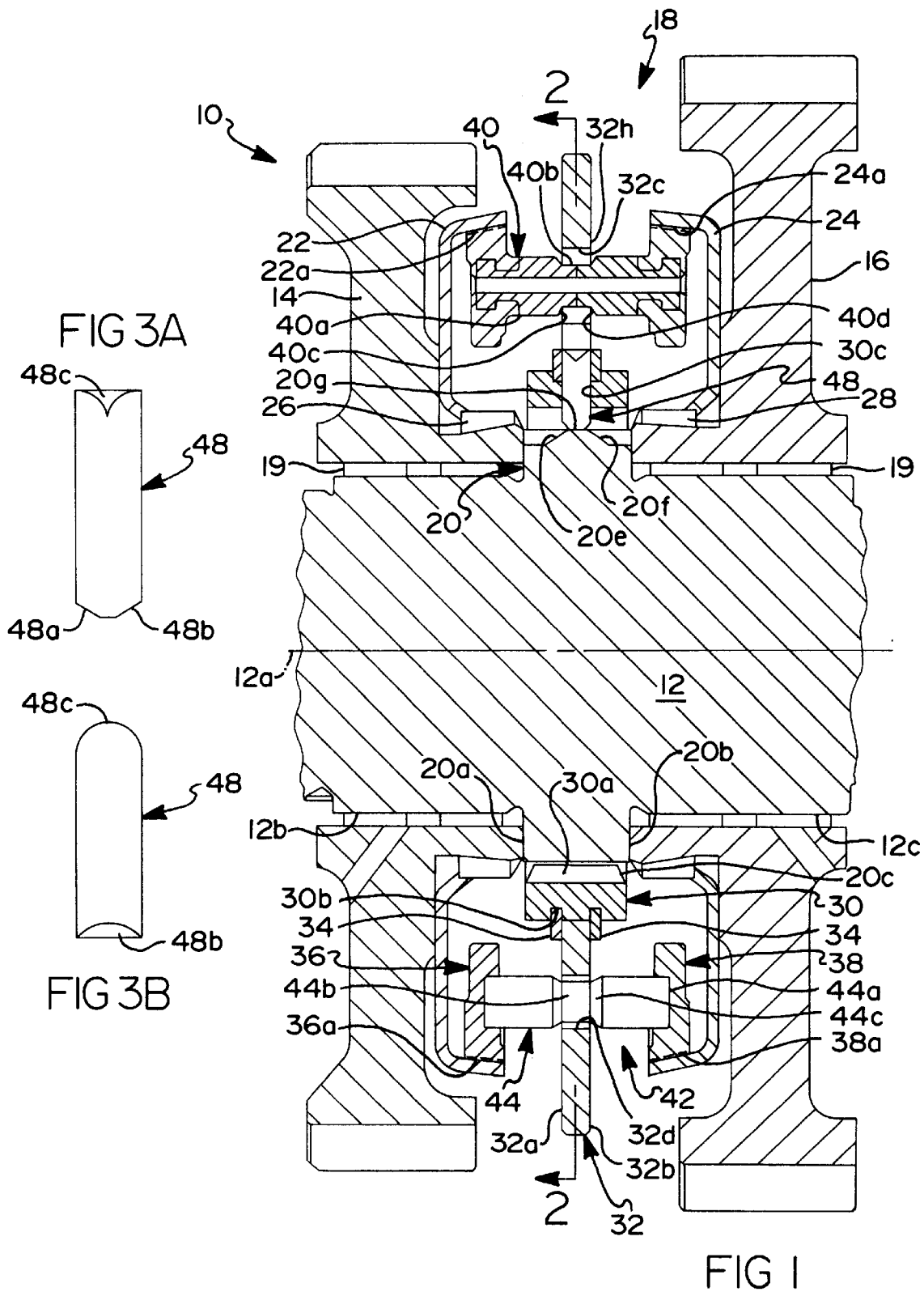

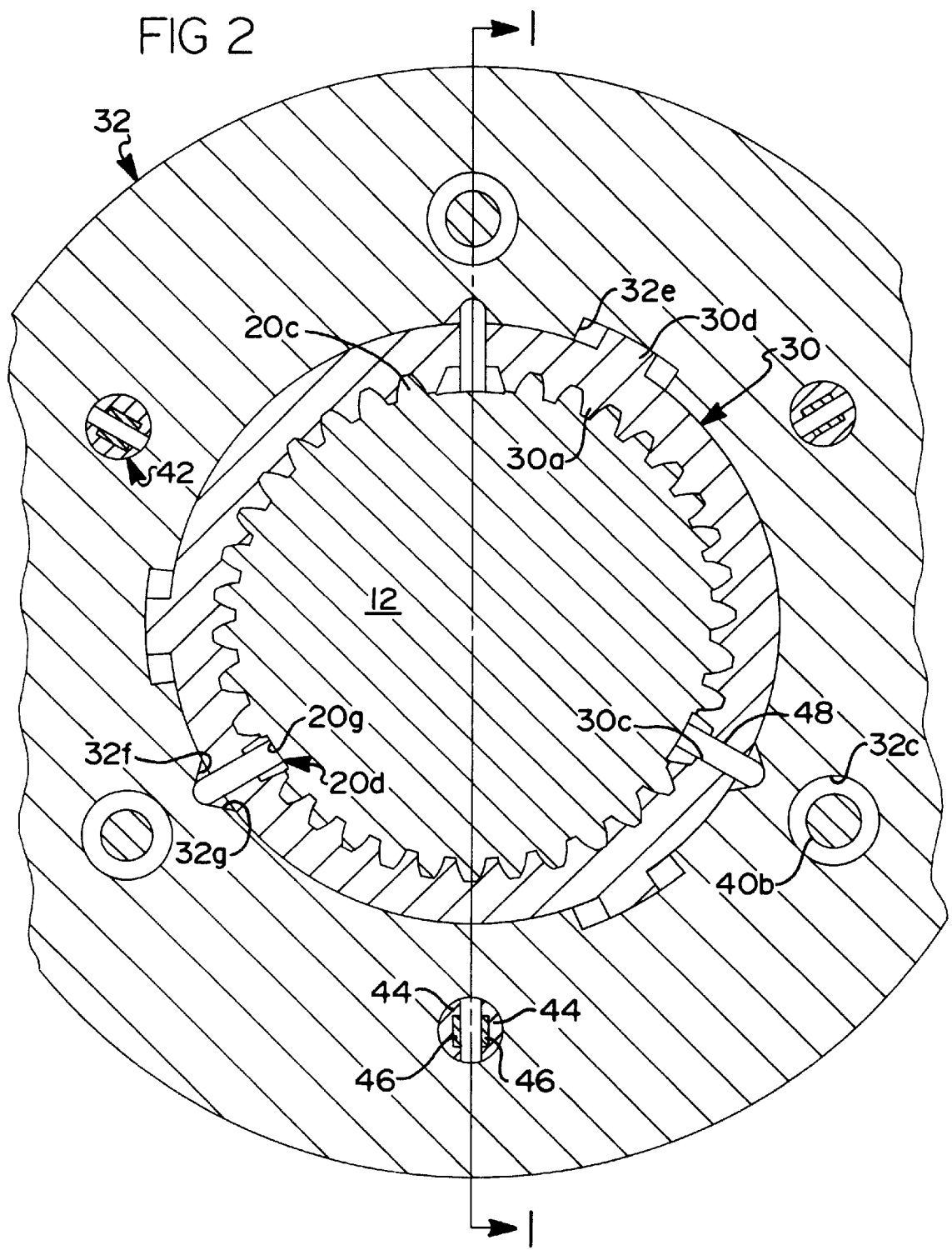

SYNCHRONIZER INCLUDING RADIALLY-MOVEABLE, RESILIENTLY-BIASED SELF-ENERGIZING MEMBER

CROSS-REFERENCE TO RELATED APPLICATION

This application, having attorney docket number 95-rTRN-406, relates to U.S. application Ser. Nos. 08/908,091; 08/908,087; 08/908,086; 08/908,093; 08/908,090; filled Aug. 11, 1997, and respectively having attorney docket numbers 95-rELT-217, 91-TRN-499, 94-rELT-154; 94rELT-247 and 97-rTRN-259, and all assigned to the assignee of this application.

FIELD OF THE INVENTION

This invention relates to a synchronizer for a transmission.

BACKGROUND OF THE INVENTION

It is well known that synchronizers may be used in multiple speed ratio transmissions to assist shifting of all or some of the transmission gear ratios. It is also known that the shift effort and/or time to perform a shift may be reduced by use of synchronizers of the self-energizing or boost type. Since required operator shift effort generally increases with vehicle size, synchronizers of the self-energizing type are especially useful in transmissions for heavy duty trucks and/or in transmissions where reduced shift time and/or reduced shift effort are preferred. Prior art examples of synchronizers that may be relevant to the synchronizer herein may be seen by reference to U.S. Pat. Nos. 5,078,245; 5,092,439; Japanese Patent Publication (Kokoku) 45-27483; and German Patent Publication 1,098,824 which are incorporated herein by reference.

SUMMARY OF THE INVENTION

An object of this invention is to provide a synchronizer with improved self-energizing means.

According to the invention, a synchronizer, as disclosed in Japanese Patent Publication 45-27483 and representing the prior art as referred to in the pre-characterizing portion of claim 1, includes a synchronizer for frictionally synchronizing and positive connecting first and second drives disposed for relative rotation about a common axis. The synchronizer comprises first jaw means axially movable into engagement with second jaw means for positive connecting the drives in response to engaging movement of first jaw means by an axially directed shift force ($F_o$). First friction means are axially movable into engagement with second friction means in response to the engaging movement of the first jaw means for producing a synchronizing torque. Blocker means are movable into engagement in response to the engaging movement of the first jaw means for preventing asynchronous engagement of the jaw means and for transmitting the shift force ($F_o$) to the first friction means to effect an engagement force on the friction means. Self-energizing means are operative to react the synchronizing torque for producing an additive axial force ($F_a$) in the direction of the shift force ($F_o$) for increasing the engagement force on the friction means. Force limiting means limit the force of the additive axial force ($F_a$).

The improvement is characterized by the force limiting means including resilient means positioned to radially transmit the synchronizing torque between first member and the first drive.

BRIEF DESCRIPTION OF THE DRAWINGS

The synchronizer of the invention is shown in the accompanying drawings in which:

FIG. 1 illustrates a double-acting synchronizer in a neutral position and sectioned along line 1—1 of FIG. 2;

FIG. 2 illustrates the synchronizer of FIG. 1 sectioned along line 2—2 of FIG. 1;

FIGS. 3A and 3B illustrate two enlarged views of a component in FIGS. 1 and 2 respectively viewed perpendicular and parallel to an axis of the shaft therein;

Figure 4:
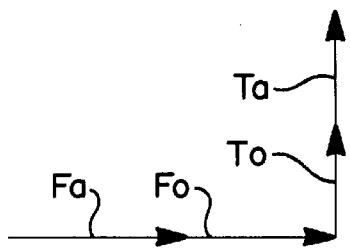
FIG. 4 is a graphical representation of axial forces and torques acting on a shift flange of the synchronizer.

The drawings are simplified by omitting background lines of components therein.

DETAILED DESCRIPTION OF THE DRAWINGS

The term "synchronizes", used herein, shall designate a clutch mechanism utilized to non-rotatably couple a selected ratio gear to a shaft by means of a positive clutch in which attempted engagement of the positive clutch is prevented until members of the positive clutch are brought to substantially synchronous rotation by a synchronizing friction clutch associated with the positive clutch. The term "self-energizing" shall designate a synchronizer clutch mechanism which includes ramps or cams or the like to increase the engaging force of the synchronizing friction clutch in relation to the synchronizing torque of the friction clutch.

Looking now at FIGS. 1, 2, 3A and 3B, therein is shown a gear and synchronizer assembly 10 including a drive or shaft 12 to be mounted for rotation in a transmission about an axis 12a, axially spaced apart drives or gears 14, 16, and a double-acting synchronizer 18.

The shaft 12 includes cylindrical surfaces 12b, 12c rotatably supporting the gears thereon via bearings 19 and an annular member 20 having an outer circumference greater in diameter than the diameters of the cylindrical surfaces. The annular member has an axial length separating the gears via axially oppositely facing shoulders 20a, 20b which limit axial movement of the gears toward each other. Axial movement of the gears away from each other is limited in any of several known manners. The annular member may be formed of a ring affixed to the shaft or, as herein, formed integral with the shaft. The outer circumference of the annular member includes external splines 20c formed therein and three recesses 20d of axial length equal to the axial length of the annular member and self-energizing cams 20e, 20f, explained further hereinafter. Each recess may be formed by removing all or some of a spline 20c.

The synchronizer mechanism 18 includes friction rings 22, 24 and jaw members 26, 28 affixed to gears 14,16, an axially movable jaw member 30 having internal spline teeth 30a slidably mating continuously with the external spline teeth 20c formed in the outer circumference of annular member 20, a radially extending shift flange 32 having axially oppositely facing sides 32a, 32b sandwiched between axially facing sides of retainers 34 disposed in annular grooves 30b in jaw member 30, axially movable annular friction rings 36, 38 rigidly secured together by three circumferentially spaced apart pins 40 extending axially from each of the friction rings and through openings 32c in the flange, and three pre-energizer assemblies 42 shown in relief in FIG. 1. In the embodiment of FIGS. 1 and 2 retainers 34 prevent axial movement between jaw member 30 and flange 32, and allow relative rotation therebetween.

The friction rings include cone friction surfaces 22a, 36a and 24a, 38a that engage for frictionally synchronizing the gears to the shaft prior to engagement of the jaw members. A wide range of cone angles may be used; cone angles of seven and one-half degrees may be used for the synchronizer herein. The friction surfaces 36a, 38a and/or 22a, 24a may be defined by any of several known friction materials affixed to the base member; herein, pyrolytic carbon friction materials, such as disclosed in U.S. Pat. Nos. 4,700,823; 4,844,218; and 4,778,548, are preferred. These patents are incorporated herein by reference.

Pins 40 each include major diameter portions 40a having diameters slightly less than the diameter of flange openings 32c, a reduced diameter or groove portion 40b spaced between friction rings 36, 38 (herein midway), and conical blocker shoulders or surfaces 40c, 40d extending radially outwardly from the pin axis and axially away from each other at angles relative to a plane normal to the pin axis. The grooved portions, when disposed within their respective flange openings, allow limited rotation of the rigid friction ring and pin assembly relative to the flange to effect engagement of the pin blocker shoulders with chamfered blocker shoulders 32h defined about the flange openings 32c. The pins may be rigidly secured to friction rings 36, 38 in any of several known manners.

The pre-energizer assemblies 42 may be any of several types, herein they are of the split pin-type which are more completely shown and described in U.S. Pat. No. 5,339,936. Each pre-energizer assembly extends axially between the friction rings 36, 38 and through one of openings 32d in the shift flange. The openings 32d are alternately spaced between openings 32c. It should suffice herein to mention that each pre-energizer assembly includes two shells 44 having ends 44a and at least two leaf springs 46 sandwiched between and biasing the shells apart. Each pair of shells 44 forms a major diameter less than the diameter of its associated opening 32d when squeezed together, an annular groove 44b with chamfered end surfaces 44c, and the ends 44a. As is known, ends 44a react against friction rings 36, 38 and chamfers 44c react against chamfers about opening 32d in flange 32 in response to initial engaging movement of flange 32, thereby effecting initial engaging movement of the friction clutches and initial torque for rotating pins 40 relative to flange 32 and positioning the blocker shoulders for engagement.

As previously mentioned, jaw member 30 includes internal spline teeth 30a which slidably mate with external spline teeth 20c of member 20 affixed to the shaft. The external splines have flank surfaces extending parallel to the shaft axis and the mating thereof with flank surfaces of the jaw member splines prevents relative rotation therebetween. Jaw member 30 further includes three radially extending openings 30c each having a self-energizing link 48 slidably extending therethrough, and three lugs 30d on the outer periphery thereof and extending radially outward into recesses 32e in the inner periphery of flange 32. The lugs and recesses define stops for limiting the amount of relative rotation between flange 32 and jaw member 30 which is rotationally fixed to shaft 12. Links 48 are shown in relief in all of the figures. Each recess has a circumferential length greater than the circumferential length of the lug therein for allowing limited relative rotation between flange 32 and jaw member 30 to effect actuation of the self-energizing mechanism.

Flange 32 further includes three pairs of cam surfaces 32f, 32g in the inner periphery thereof for moving the links 48 radially inward against either cam surface 20e or 20f for reacting synchronizing torque between the cone clutches and shaft to provide an additive axial self-energizing force for increasing the engaging force of the cone clutches initially engaged by a shift force applied to flange 32, thereby increasing the synchronizing torque provided by the cone clutches. Ramp or cam follower surfaces 48a, 48b on link 48 respectively react against cam surfaces 20f, 20e to provide the additive axial force for respectively increasing synchronizing torque of gears 16, 14 for upshift and downshift in response to the relative rotation of the flange respectively engaging cam surfaces 32f, 32g with a cylindrical ramp or cam follower surface 48c of link 48. The cam surfaces, as shown herein, provide increasing synchronizing force for both gears and for increasing synchronizing force for up and down shifts. The cam surfaces 20e, 20f may be formed such that a first imaginary line in each surface thereof lies in an imaginary plane parallel to the shaft axis 12a and a second imaginary line in each surface thereof forms a right angle to both the first imaginary line and the imaginary plane parallel to the axis. The cam follower surfaces 48a, 48b may be formed according to the same rules as cam surfaces 20e, 20f. The cam surfaces 32f, 32g may be formed such that a first imaginary line in the surface thereof lies in an imaginary plane perpendicular to the shaft axis 12a, and a second imaginary line in the surface forms a right angle to both the first imaginary line and the imaginary plane perpendicular to the axis. The cam follower surface 48c may be formed according to the same rules as cam surfaces 32f, 32g. The first imaginary line in all of the cam surfaces may be curved as shown in cam follower surface 48c.

When the flange 32 is in the neutral position of FIG. 1, reduced diameter portions 40b of pins 40 are aligned with flange openings 32c, friction surfaces of the cone clutches are slightly spaced apart and are maintained in a spaced apart relation by the chamfered or angled pre-energizer surfaces 44c of the pre-energizers 42 acting on the pre-energizer chamfered surfaces about flange openings 32d by the force of springs 46, and links 48 are aligned for contact with axially extending flats 20g between cams 20e, 20f. The flats 20g and axial force provided by the pre-energizer surfaces prevent self-energizing and inadvertent engagement of the synchronizer due to viscous shear of oil between the cone clutch surfaces. When it is desired to couple either gear to the shaft, an appropriate and unshown shift mechanism, such as disclosed in U.S. Pat. No. 4,920,815 and incorporated herein by reference, is connected to the outer periphery of flange 32 in known manner for moving the flange axially along the axis of shaft 12 either left to couple gear 14 or right to couple gear 16. The shift mechanism may be manually moved by an operator through a linkage system, may be selectively moved by an actuator, or may be moved by means which automatically initiate shift mechanism movement and which also controls the magnitude of the force applied by the shift mechanism. When the shift mechanism is manually moved, the force is proportional to the force applied by the operator to a shift lever. Whether manually or automatically applied, the force is applied to flange 32 in an axial direction and is represented by the length of arrow $F_o$ in FIG. 4.

Initial rightward axial movement of flange 32 by the operator shift force $F_o$ is transmitted to pre-energizer surfaces 44c to effect initial frictional engagement of cone surface 38a with cone surface 24a. The initial engagement force on the cone surface is of course a function of the force of springs 46 and the angles of the pre-energizer surfaces. The initial frictional engagement (provided an asynchronous condition exists and momentarily ignoring the effect of the self-energizing cams) produces an initial cone clutch engaging force and initial synchronizing torque which ensures limited relative rotation between flange 32 and the engaged friction ring, and hence, movement of the reduced diameter pin portions 40b to the appropriate sides of the flange openings 32c to provide engagement of pin blocker shoulders 40d with the blocker shoulders 32h disposed about openings 32c. When the blocker shoulders are engaged, the full operator shift force $F_o$ on flange 32 is transmitted to friction ring 38 via the blocker shoulders, whereby the cone clutch is engaged by the full force of the operator shift force $F_o$ to provide a resultant operator synchronizing torque $T_o$. This operator synchronizing torque $T_o$ is represented by arrow $T_o$ in FIG. 4. Since the blocker shoulders are disposed at angles relative to the axial direction of operator shift force $F_o$, they produce a counter force or unblocking torque which is counter to the synchronizing torque from the cone clutch but of lesser magnitude during asynchronous conditions. As substantial synchronism is reached, the synchronizing torque drops below the unblocking torque, whereby the blocker shoulders move the pins 40 into concentric relation with openings 32c to allow continued axial movement of the flange and engagement of the internal spline/jaw teeth 30a of jaw member 30 with external spline/jaw teeth of jaw member 28 of gear 16. The splineaw teeth may be configured as shown in U.S. Pat. Nos. 3,265,173 and 4,246,993 which are incorporated herein by reference.

Still ignoring the effects of the self-energizing ramps, cone clutch torque provided by the force $F_o$ is expressed by equation (1).

$$T_o = F_o R_c \mu_c / \sin\alpha \qquad (1)$$

where:
  $R_c$=the mean radius of the cone friction surface,
  $\mu_c$=the coefficient of friction of the cone friction surface, and
  $\alpha$=the angle of the cone friction surfaces.

Looking now at the affects of the self-energizing cams, the synchronizing torque $T_o$, due to the operator applied axial shift force $F_o$, is of course transmitted to flange 32 by pins 40 and is reacted to shaft 12 across the self-energizing cam surfaces via links 48. The self-energizing cam surfaces, when engaged, produce the axial additive force $F_a$ acting on the flange in the same direction as shift force $F_o$. The axial additive force $F_a$ is applied to the engaged friction surfaces through the blocker surfaces via a force path including link 48 reacting axially against jaw clutch opening 30c, the retainer ring 34, and the flange 32. The forces $F_o$ and $F_a$ are applied to shift flange 32 in parallel and sum to provide a total force $F_t$, thereby further increasing the engaging force of the cone clutch to provide an additive synchronizing torque $T_a$ which adds to the torque $T_o$ to provide a total torque $T_t$. The sum of the axial forces for engaging the cone clutch are $F_o$ plus $F_a$ and the sum of the synchronizing torques being produced by the cone clutch are $T_o$ plus $T_a$, as graphically shown in FIG. 4. For a given operator shift force $F_o$ and an operator synchronizing torque $T_o$, the magnitude of the axial additive force is preferably a function of the angles of the engaged selfenergizing ramp surfaces. These angles are preferably great enough to produce an additive force $F_a$ of magnitude sufficient to significantly increase synchronizing torque and decrease synchronizing time in response to a given moderate shift effort by the operator. However, these angles are also preferably low enough to produce a controlled axial additive force $F_a$, i.e., the force $F_a$ should preferably increase or decrease in response to the force $F_o$ increasing or decreasing. If the ramp angles are too great, the ramps are self-locking rather than self-energizing; hence, once initial engagement of the cone clutch is effected the force $F_a$ will rapidly and uncontrollably increase independent of the force $F_o$, thereby driving the cone clutch toward uncontrolled lockup. Self-locking rather than self-energizing decreases shift quality or shift feel, may over stress synchronizer components, and may cause over heating and rapid wear of the cone clutch surfaces.

The main variables and equations for calculating self-energizing ramp angles may be seen by reference to previously mentioned U.S. Pat. No. 5,092,439.

Figure 5:
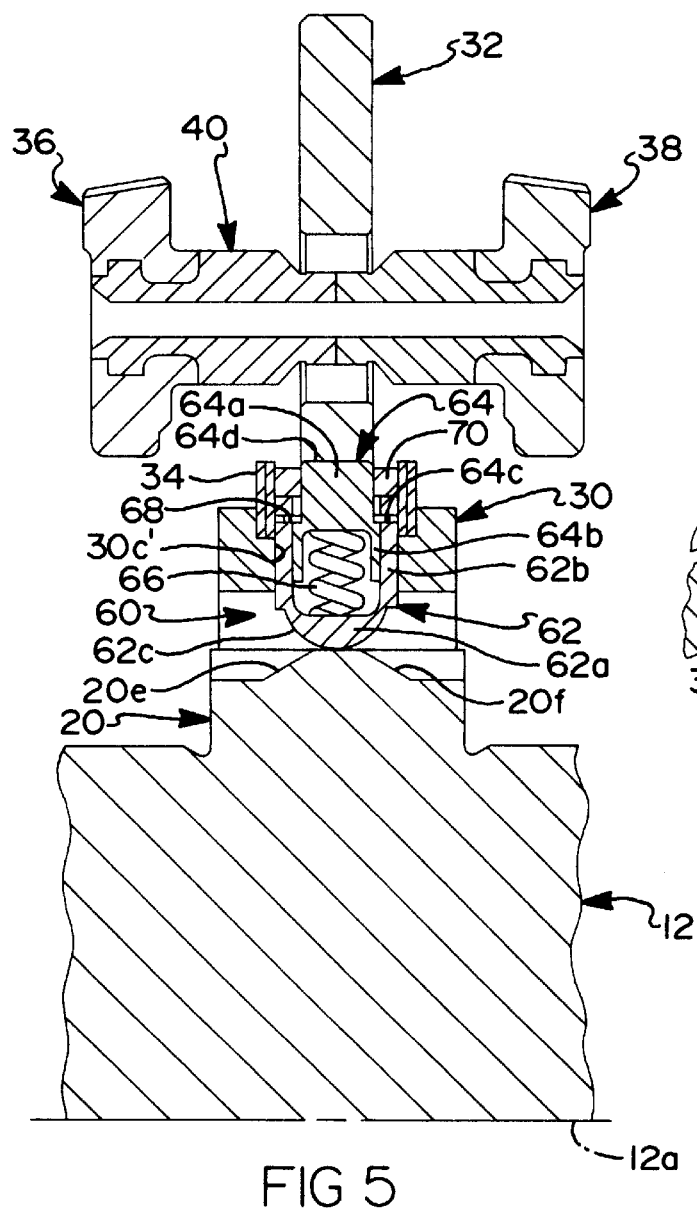
FIGS. 5 and 6 illustrate a modified embodiment of self-energizing components in FIGS. 1 and 2.
Figure 6:
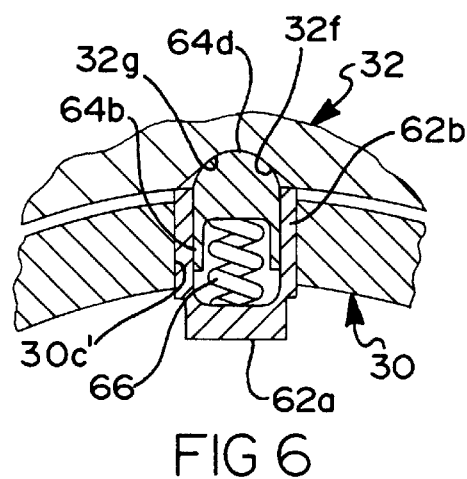

FIGS. 5 and 6 illustrate portions of the synchronizer in FIGS. 1 and 2 modified to include force limiting by springs for limiting the maximum amount of additive axial force $F_a$ that the cam surfaces produce. The modification is mainly concerned with replacing links 48 with spring capsules 60 that resiliently transmit the synchronizing torque radially from cam surfaces 32f, 32g to cam surfaces 20e, 20f. Jaw member 30 is provided with larger diameter radially extending openings 30c' which have a spring capsule 60 disposed therein in a manner analogous to pins 48.

Each spring capsule includes cup like members 62, 64 respectively having ends 62a, 64a with cylindrical skirts 62b, 64b slidably receiving each other and defining an interior chamber having a compression spring 66 therein and biasing the members 62, 64 radially in opposite directions. Separation of the members beyond that shown is prevented by engagement of a shoulder 64c with pins 68 pressed into openings in skirt 62b. Ends 62a, 64a may have curved or cylindrical cam follower surfaces 62c, 64d like cam follower surfaces 48c of link 48. An advantage of curved surfaces 62c and/or 64d is that they may be used without change when the angles and/or curvature of cam surfaces 20e, 20f, 32f, 32g are changed to vary the amount or characteristics of the additive axial force. The lugs 30d and recesses 32e limit the maximum amount of synchronizing torque that springs 66 can transmit from 32f, 32g to cam surfaces 20e, 20f and therefore the maximum amount of additive axial force that can be developed on cam surfaces 20e, 20f. The additive axial force is applied to the cone clutches via a force path including member 62, jaw member 30 via the surfaces of radially extending openings 30c', retainers 34, flange 32 via spacer rings 70 disposed between the flange and the retainers, and the blocker surfaces.

The spring capsules may be configured to prevent curved surfaces 62c and/or 64d from misalignment with cam surfaces 20e, 20f, 32f and 32g. For example, ends 64a may have flat axially facing sides between spacer rings 70 with ends 62 fixed against rotation relative to ends 64, or the surfaces 62c, 64d and 20e, 20f, 32f and 32g may have mating convexi-concave surfaces in the plane perpendicular to the line of motion.

A pin-type synchronizer with an alterative embodiment has been disclosed to illustrate inventive subject matter herein. The following claims are intended to cover inventive portions of the disclosed subject matter and variations and modifications believed to be within the spirit of the invention.

What is claimed is:

1. A synchronizer for frictionally synchronizing and positively connecting first and second drives disposed for relative rotation about a common axis; the synchronizer comprising:

for first jaw means axially movable into engagement with second jaw means for positively connecting the drives in response to engaging movement of the first jaw means by an axially directed shift force ($F_o$);

first friction means axially movable into engagement with second friction means in response to the engaging movement of the first jaw means by the shift force ($F_o$) for producing the synchronizing torque ($T_o$);

blocker means movable into engagement in response to the engaging movement of the first jaw means for preventing asynchronous engagement of the first and second jaw means and for transmitting the shift force ($F_o$) to the first friction means to effect an engagement force of the first and second friction means;

self-energizing means operative when engaged to react the synchronizing torque for producing an additive axial force ($F_a$) in a direction of the shift force ($F_o$) for increasing the engagement force of the first and second friction means; and force limiting means for limiting the force of the additive axial force ($F_a$); characterized by:
the force limiting means including resilient means positioned to radially transmit the synchronizing torque between a first member and the first drive.

2. The synchronizer of claim 1, wherein:
the first member mounted for limited rotation relative to the first drive in response to the synchronizing torque; and
the force limiting means including stop means limiting relative rotation between the first member and first drive for limiting the radially transmitted torque by the resilient means to a predetermined maximum and for limiting the synchronizing torque reacted by the self-energizing means.

3. The synchronizer of claim 2, wherein:
the stop means includes first and second stops respectively affixed against rotation relative the first member and the first drive and engaged in response to a predetermined amount of relative rotation between the first member and the first drive.

4. The synchronizer of claim 1, wherein:
the self-energizing means includes first and second cams respectively affixed to the first member and the first drive; and
the resilient means radially positioned between the cams for transmitting the synchronizing torque radially between the first and second cams.

5. The synchronizer of claim 4, wherein:
the resilient means is a spring disposed in a radially extending opening in the first jaw means.

6. The synchronizer of claim 4, wherein:
the first member mounted for limited rotation relative to the first drive in response to the synchronizing torque; and
the force limiting means including stop means limiting relative rotation between the first member and the first drive for limiting the radially transmitted torque by the resilient means to a predetermined maximum and for limiting the synchronizing torque reacted by the self-energizing means.

7. The synchronizer of claim 6, wherein:
the stop means includes first and second stops respectively affixed against rotation relative the first member and the first drive and engaged in response to a predetermined amount of relative rotation between the first member and the first drive.

8. The synchronizer of claim 7, wherein:
the resilient means is a spring disposed in a radially extending opening in the first jaw means.

9. The synchronizer of claim 7, wherein:
the resilient means is a spring capsule disposed in a radially extending opening in the first jaw means and the spring capsule including first and second ends biased radially in opposite directions by the spring, the first and second ends respectively having first and second cam followers surfaces respectively reacting against the first and second cams.

10. The synchronizer of claim 9, wherein:
the first member is a radially extending flange concentric to the axis and moved axially by the shift force, the flange includes the first cam;

retainer means connect the flange for axial movement with the first jaw means;

the blocker means including at least first and second blocker surfaces, the first blocker surface defined by a pin member rigidly extending axially from the first friction means and into an opening in the flange, the second blocker surface defined about the opening;

the first jaw means including a radially extending opening having the spring capsule disposed therein and between the first and second cams; and the spring capsule operative, when transmitting torque between the cams, to transmit the additive axial force ($F_a$) to the first friction means via a force path including the first jaw means via the radially extending opening, the retainer means, the flange and the blocker surfaces.

11. A synchronizer for frictional and positive connection of first and second drives disposed for relative rotation about a common axis; the synchronizer comprising:

a first jaw member non-rotatable relative to the first drive and axially movable relative to the drives from a neutral position to an engaged position with a second jaw member for positively connecting the drives in response to engaging movement of the first jaw member by an axially directed shift force ($F_o$) moving a radially extending flange toward the second jaw member;

a retainer assembly connecting the flange for axial movement with the first jaw member;

a first friction member axially movable into engagement with a second friction member in response to an initial portion of the engaging movement of the first jaw member for producing an initial synchronizing torque;

first and second blocker surfaces movable into engagement in response to the initial synchronizing torque for preventing asynchronous engagement of the jaw members, for transmitting the shift force ($F_o$) to effect an engagement force of the friction members, and for producing a torque counter to the synchronizing torque for moving the blocker surfaces out of engagement as synchronization is reached, the first blocker surfaces defined by a plurality of circumferentially spaced pin members rigidly extending axially from the first friction member and into openings in the flange, the second blocker surfaces defined about the openings, and the pin members operative to transmit the synchronizing torque to the flange;

first and second cam surfaces respectively affixed for rotation with the flange and the first drive and operative to react the synchronizing torque therebetween to produce an additive axial force ($F_a$) applied to the flange in a direction of the shift force ($F_o$) for increasing the engagement force of the friction members; and force limiting means for limiting a magnitude of the additive axial force ($F_a$) characterized by:
the force limiting means including resilient means positioned to radially transmit the synchronizing torque between the first and second cam surfaces.

12. The synchronizer of claim 11, wherein:

the force limiting means including stop means limiting relative rotation between the flange and the first drive for limiting the radially transmitted torque by the resilient means to a predetermined maximum and for limiting the synchronizing torque reacted by the cam surfaces.

13. The synchronizer of claim 12, wherein:

the stop means includes first and second stops respectively affixed to the flange and the first drive and engaged in response to a predetermined amount of relative rotation between the flange and the first drive.

14. The synchronizer of claim 11, wherein:

the resilient means is a spring disposed in a radially extending opening in the first jaw member.

15. The synchronizer of claim 14, wherein:

the spring is in a capsule slidably disposed in the radially extending opening and the capsule including first and second ends biased radially in opposite directions by the spring, the first and second ends respectively having first and second cam followers respectively reacting against the first and second cam surfaces.

16. The synchronizer of claim 15, wherein:

the force limiting means includes stop means limiting relative rotation between the flange and the first drive for limiting the radially transmitted torque by the spring to a predetermined maximum and for limiting the synchronizing torque reacted by the cam surfaces.

17. The synchronizer of claim 16, wherein:

the stop means includes first and second stops respectively affixed to the flange and the first drive and engaged in response to a predetermined amount of relative in rotation between the flange and the first drive.

* * * * *